US012571906B2

(12) United States Patent
McFadden et al.

(10) Patent No.: US 12,571,906 B2
(45) Date of Patent: Mar. 10, 2026

(54) SYSTEM AND METHOD FOR DETECTING OBJECT PATTERNS USING ULTRA-WIDEBAND (UWB) RADAR

(71) Applicant: Xonar Technology Inc., Largo, FL (US)

(72) Inventors: Jeffrey McFadden, Dunedin, FL (US); William Kerry Keal, San Jose, CA (US); Marek Ponarski, Clearwater, FL (US)

(73) Assignee: Xonar Technology Inc., St. Petersburg, FL (US)

( * ) Notice: Subject to any disclaimer, the term of this patent is extended or adjusted under 35 U.S.C. 154(b) by 302 days.

(21) Appl. No.: 18/131,516

(22) Filed: Apr. 6, 2023

(65) Prior Publication Data

US 2023/0243957 A1 Aug. 3, 2023

Related U.S. Application Data

(63) Continuation-in-part of application No. 17/040,242, filed as application No. PCT/US2019/023347 on Mar. 21, 2019, now Pat. No. 11,656,334.

(Continued)

(51) Int. Cl.
*G01S 13/88* (2006.01)
*G01S 7/41* (2006.01)
(Continued)

(52) U.S. Cl.
CPC ............ *G01S 13/887* (2013.01); *G01S 7/412* (2013.01); *G01S 13/0209* (2013.01); *G01V 3/08* (2013.01)

(58) Field of Classification Search
CPC ...... G01S 13/0209; G01S 13/86; G01S 13/87; G01S 13/887; G01S 7/412; G01V 3/08
See application file for complete search history.

(56) References Cited

U.S. PATENT DOCUMENTS

| | | | |
|---|---|---|---|
| 6,218,979 | B1 | 4/2001 | Barnes et al. |
| 6,882,301 | B2 | 4/2005 | Fullerton |

(Continued)

FOREIGN PATENT DOCUMENTS

| | | |
|---|---|---|
| CN | 1426164 A | 6/2003 |
| CN | 2598263 Y | 1/2004 |

(Continued)

OTHER PUBLICATIONS

Chinese Office Action and Search Report dated Apr. 30, 2024 for CN201980030180.9 (with machine Engl. Translation).

(Continued)

*Primary Examiner* — Timothy X Pham
(74) *Attorney, Agent, or Firm* — Fishman Stewart PLLC

(57) ABSTRACT

A system includes an ultra-wideband (UWB) radar having a transmitter that transmits electromagnetic waves toward a region-of-interest (ROI) and a receiver that receives reflected electromagnetic waves coming from the ROI. The system also includes at least one device configured to detect metal in a lower region of the ROI, a pattern recognition device, and a signaling device. The pattern recognition device includes a processor and is configured to identify at least one object-of-interest (OOI), via the reflected electromagnetic waves, that is moving through the ROI. The signaling device is configured to send an alert when i) the pattern recognition device identifies an OOI and ii) metal is detected by at least one metal detector or the at least one magnetometer.

16 Claims, 7 Drawing Sheets

Related U.S. Application Data

(60) Provisional application No. 62/647,090, filed on Mar. 23, 2018, provisional application No. 62/647,130, filed on Mar. 23, 2018, provisional application No. 63/445,397, filed on Feb. 14, 2023.

(51) Int. Cl.
| | |
|---|---|
| *G01S 13/02* | (2006.01) |
| *G01V 3/08* | (2006.01) |

(56) References Cited

U.S. PATENT DOCUMENTS

| | | | |
|---|---|---|---|
| 6,933,882 B2 | 8/2005 | Fullerton | |
| 6,950,485 B2 | 9/2005 | Richards et al. | |
| 6,967,613 B2 | 11/2005 | Holmberg et al. | |
| 7,148,836 B2 | 12/2006 | Romero et al. | |
| RE39,759 E | 8/2007 | Fullerton | |
| 7,345,618 B1 | 3/2008 | Cole et al. | |
| 7,486,221 B2 | 2/2009 | Meyers et al. | |
| 7,592,944 B2 | 9/2009 | Fullerton et al. | |
| 7,612,711 B1 | 11/2009 | McIntire et al. | |
| RE41,479 E | 8/2010 | Fullerton | |
| 7,808,432 B2 | 10/2010 | Fedora | |
| 7,884,757 B2 | 2/2011 | Mohamadi et al. | |
| 7,995,644 B2 | 8/2011 | Sahinoglu | |
| 8,063,817 B2 | 11/2011 | Christianson | |
| 8,098,193 B2 | 1/2012 | Sai et al. | |
| 8,237,604 B2 | 8/2012 | Mohamadi et al. | |
| 8,306,265 B2 | 11/2012 | Fry et al. | |
| 8,358,234 B2 | 1/2013 | Mohamadi et al. | |
| 8,362,942 B2 | 1/2013 | McNeill et al. | |
| 8,368,586 B2 | 2/2013 | Mohamadi et al. | |
| 8,441,393 B2 | 5/2013 | Strauch et al. | |
| 8,593,329 B2 | 11/2013 | Mohamadi et al. | |
| 8,779,965 B2 | 7/2014 | Sentelle et al. | |
| 8,890,745 B2 | 11/2014 | Wahlquist et al. | |
| 9,063,232 B2 | 6/2015 | McNeill et al. | |
| 9,182,481 B2 | 11/2015 | Bowring et al. | |
| 9,229,102 B1 | 1/2016 | Wright et al. | |
| 9,244,163 B2 | 1/2016 | Mohamadi | |
| 9,316,727 B2 | 4/2016 | Sentelle et al. | |
| 9,316,732 B1 * | 4/2016 | Mohamadi | G01S 13/0209 |
| 9,325,453 B2 | 4/2016 | Heurguier | |
| 9,329,072 B2 | 5/2016 | Sai | |
| 9,329,074 B2 | 5/2016 | Sai | |
| 9,372,256 B2 | 6/2016 | Mohamadi | |
| 9,753,122 B2 | 9/2017 | Duvoisin, III et al. | |
| 2004/0178942 A1 | 9/2004 | McLemore | |
| 2004/0178952 A1 | 9/2004 | Jenkins | |
| 2005/0105637 A1 | 5/2005 | Fitzpatrick | |
| 2007/0190953 A1 | 8/2007 | Tan Eng Choon | |
| 2007/0242730 A1 | 10/2007 | Birru | |
| 2008/0074307 A1 | 3/2008 | Boric-Lubecke et al. | |
| 2010/0154056 A1 | 6/2010 | Smith | |
| 2011/0102235 A1 | 5/2011 | Abdillah | |
| 2011/0148686 A1 | 6/2011 | Cole et al. | |
| 2013/0169466 A1 * | 7/2013 | Frederick | G01S 13/86 342/22 |
| 2015/0253422 A1 | 9/2015 | Morton | |
| 2015/0301167 A1 | 10/2015 | Sentelle et al. | |
| 2015/0379356 A1 * | 12/2015 | Nikolova | G01S 7/024 342/90 |
| 2017/0230518 A1 | 8/2017 | Miyamori | |
| 2017/0356936 A1 | 12/2017 | Ismail et al. | |
| 2019/0064342 A1 * | 2/2019 | Daisy | G01S 13/0209 |

FOREIGN PATENT DOCUMENTS

| | | |
|---|---|---|
| CN | 1492597 A | 4/2004 |
| CN | 1788213 A | 6/2006 |
| CN | 1926774 A | 3/2007 |
| CN | 1930490 A | 3/2007 |
| CN | 1969466 A | 5/2007 |
| CN | 101316780 A | 12/2008 |
| CN | 101523740 A | 9/2009 |
| CN | 101777062 A | 7/2010 |
| CN | 102105816 A | 6/2011 |
| CN | 102667520 A | 9/2012 |
| CN | 103454691 A | 12/2013 |
| CN | 106033981 A | 10/2016 |
| EP | 2960685 A2 | 12/2015 |
| JP | H05164852 A | 6/1993 |
| JP | H07146356 A | 6/1995 |
| JP | 2004271529 A | 9/2004 |
| JP | 2009505060 A | 2/2009 |
| JP | 3189416 U | 3/2014 |
| JP | 2014197412 A | 10/2014 |
| WO | 2006001821 A2 | 1/2006 |
| WO | 2007008678 A2 | 1/2007 |

OTHER PUBLICATIONS

IPRP dated Oct. 8, 2020 for copending International Application No. PCT/US2019/022347.

Japanese Office Action dated Jan. 12, 2023 for copending Japanese Patent App. No. 2021-500493 (with English translation).

Machine English translation JP3189416.

European Office Action dated Nov. 29, 2022 for copending European Patent App. No. 19715676.3.

Harmer et al., "Millimetre Radar Threat Level Evaluation (MiRTLE) at Standoff Ranges," Proc. of SPIE, vol. 8188, 81880L, Oct. 19, 2011 (Oct. 19, 2011), XP040566878, DOI: 10.1117/12.902231.

Machine English translation CN1930490A.

Japan Office Action dated Aug. 7, 2023 for JP2021-5004935 (w_translation).

Chinese Office Action dated Aug. 29, 2023 for CN201980030180.9 (w_machine_translation).

Chinese Search Report dated Aug. 27, 2023 for CN201980030180.9 (w_machine_translation).

Takuya Sakamoto et al, "Fast Imaging Method for Security Systems using Ultrawideband Radar," IEEE Transactions on Aerospace and Electronic Systems, vol. 52, Issue 2, p. 658-670, 2016.

Jamie Condliffe, "AI could make airport security checks smoother," MIT Technology Review [Japanese Edition], Oct. 28, 2016, <https://www.technologyreview.jp/s/12350/ai-body-scanners-could-solve-the-worst-thing-about-airports/>.

Japanese Office Action dated Nov. 18, 2025 for JP2021-500493 (with machine Engl. Translation).

* cited by examiner

*170*

Scanning a ROI with at Least One UWB Radar and Metal Detector — *172*

OOI Identified? — *174*

Yes — *176*

Send Alert — *178*

No — *180*

End Session? — *182*

*186* — No

Yes — *184*

End

SYSTEM AND METHOD FOR DETECTING OBJECT PATTERNS USING ULTRA-WIDEBAND (UWB) RADAR

CROSS-REFERENCE TO RELATED APPLICATIONS

The present application claims priority to U.S. Patent Application No. 63/445,397 filed Feb. 14, 2023, and is a continuation-in-part of U.S. patent application Ser. No. 17/040,242 filed Sep. 22, 2020, which is a National Stage Entry of PCT/US2019/023347 filed Mar. 21, 2019, which claims priority to U.S. Patent Application No. 62/647,090 filed Mar. 23, 2018 and U.S. Patent Application No. 62/647,130 each filed Mar. 23, 2018, the contents of each are incorporated herein by reference in their entirety.

FIELD OF TECHNOLOGY

Exemplary fields of technology for the present disclosure may relate to, for example, security screening and object detection.

BACKGROUND

The use of detection equipment to detect weapons or other contraband is carried out in many contexts. Often, detection equipment is deployed at public gathering areas to detect concealed weapons and/or other contraband. Public gathering areas include, for example, airports, voting lines, sports stadiums, entrances to government buildings, and the like.

Traditionally, detection equipment includes, for example, a metal detector, radiofrequency (RF) system, or an x-ray system to scan for weapons or contraband. However, as effective as each may be, each system may include shortcomings that need to be addressed.

For instance, metal detection equipment typically is set up at a security checkpoint, where individuals remove metal-based materials that then pass through an x-ray screening system. These checkpoints can be expensive to run and can cause bottlenecks in the amount of people that may pass through a given area. One known example is in airports. A staff of security people control passage of travelers through a walk-through metal detector. When a positive indicator is triggered by the presence of metal on a traveler, screening staff may stop the traveler for further inspection. For example, the traveler may be stopped and a detection wand may be passed over the traveler to detect and identify the item that triggered the indicator.

These types of security protocols can be staff intensive and may not always be practical. For example, sporting events and musical concerts may have many thousands of people that pass through security in a very short period of time. A large amount of staff deployed at one or more entrances may be needed to carry out airport-style security protocols in an efficient manner. Due in part to the amount of staff needed, these types of security protocols can be expensive and time-consuming. Generally, many public events and locations open to the public have similar or related challenges.

Accordingly, there is a need for systems and methods that overcome the difficulty in detecting weapons and/or other contraband on individuals in an efficient and cost-effective manner.

DETAILED DESCRIPTION

An exemplary object detection system includes at least one ultra-wideband (UWB) radar and at least one metal detector or magnetometer, each configured to detect contraband moving through a region-of-interest (ROI). The exemplary system employs the UWB radar to detect contraband that may be present on or near an individual's torso as the individual moves through the ROI, while the at least one metal detector or magnetometer is employed to detect any contraband that may be present below the individual's torso as the individual moves through the ROI.

Systems and techniques discussed herein often refer to employing one or more metal detectors. These systems and techniques, however, may employ either metal detectors or magnetometers or a combination of both. As such, when the term "metal detector" is used herein, it is understood that one or more magnetometers, or some combination of magnetometer(s) and metal detector(s), could instead be employed.

Figure 1A:
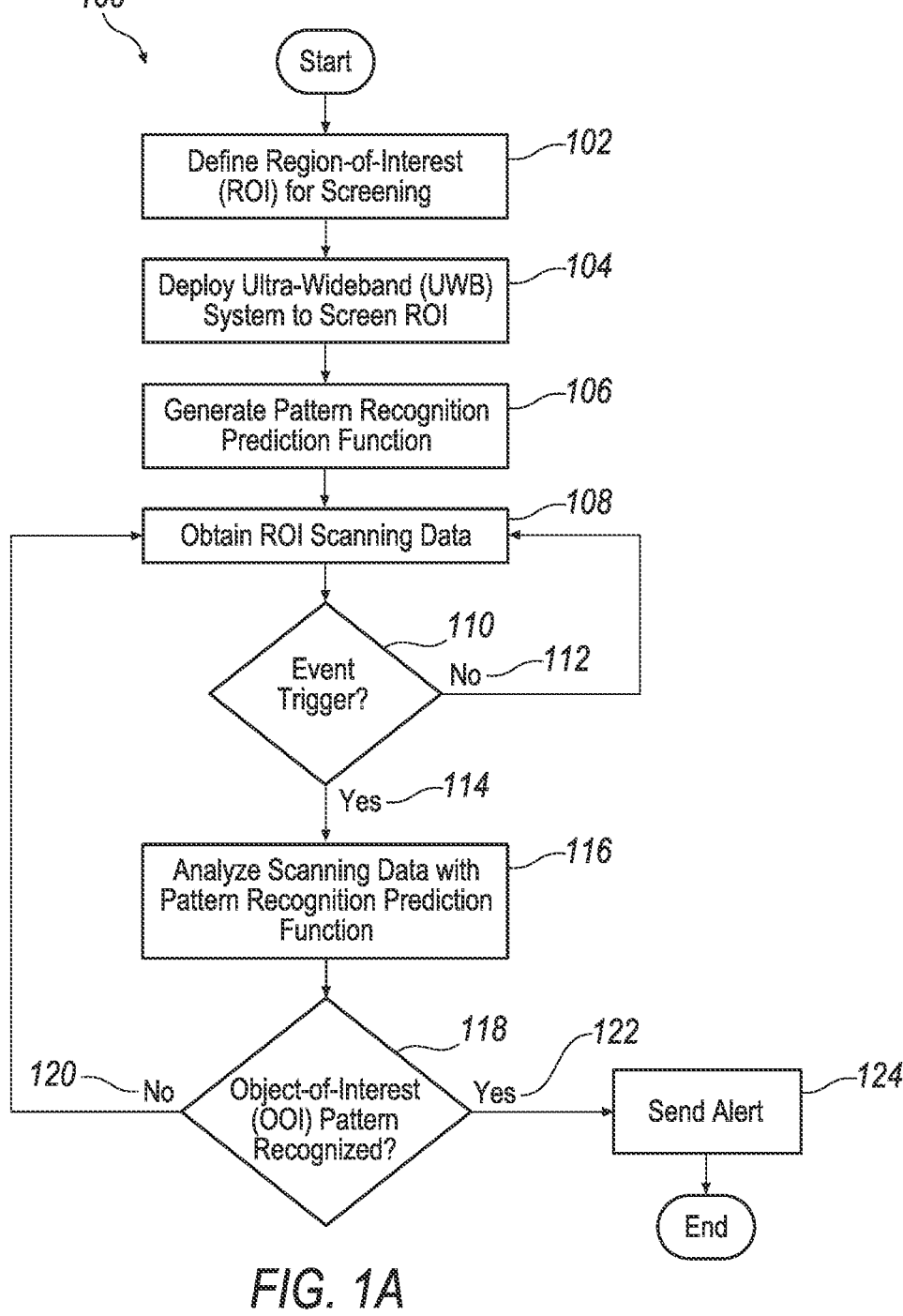
FIG. 1A illustrates an exemplary technique for detecting an object-of-interest (OOI)

FIG. 1A illustrates an exemplary technique 100 for creation of an alert when a potential object-of-interest (e.g., a weapon) on or near an individual is detected via at least one ultra-wideband (UWB) radar of an object detection system. Technique 100 includes defining a region-of-interest (ROI) at block 102. The ROI may include, for example, a walkway or passageway where individuals pass, or any other area where individuals may move through or around.

Once the ROI is defined, process control moves to block 104, where the detection system is deployed or otherwise arranged to screen individuals moving through the ROI. After set-up or deployment of the detection system, process control proceeds to block 106 where calibration occurs. Calibration may include scanning the ROI via the UWB radar(s) when no individuals are present so that the "background" can be identified (i.e., creation of background scanning data).

Further, calibration can include the creation of calibration scanning data. The calibration scanning data may be generated by scanning, via the UWB radar(s), an individual carrying an object-of-interest (OOI) such as a weapon or any other item the user would like to identify as an OOI to be detected. This may be repeated using different OOIs each time. For example, one set of calibration scanning data may represent an individual in the ROI carrying a gun, another may represent the individual carrying a knife, and yet another may represent the individual carrying an alcohol flask.

Next, the individual is again scanned via the UWB radars, but this time without any OOI. It is contemplated that the same individual need not be used for each. Regardless, the calibration scanning data now includes two data sets: one with OOI data and another without OOI data. To rephrase, the calibration data can be said to include 'ground truth' data patterns consistent with the following two primary conditions: i) an OOI present on an individual and ii) no OOI present on the individual.

This calibration scanning data (a.k.a. training dataset) is fed into a pattern recognition device The pattern recognition device may run the calibration data through a calibration heuristic, based on a convolutional neural network (CNN) architecture. The calibration heuristic may be a multi-layered heuristic that performs a convolution process on the calibration scanning datasets, ultimately yielding a 'prediction function.'

Once the object detection system is calibrated, process control proceeds to block 108 and ROI scanning data is obtained via the UWB radar(s). The scanning data is analyzed and at decision block 110 it is determined if an event is triggered. A change in data patterns may trigger an event. For example, when no individuals or objects are moving through the ROI, patterns in the received scanning data do not significantly differ from the background patterns identified during calibration. As such, an event is not triggered. Alternatively, when an object or individual moves through the ROI, patterns in the received scanning data differ from the background patterns in the calibration data and an event is triggered.

One or more thresholds may be employed to determine if an event is triggered. As such, by employing one or more thresholds, the system can avoid having background events or other "noise" from triggering an event. That is, threshold(s) can be employed to ensure that individuals moving through the ROI trigger an event, but another object (e.g., a plant) in the ROI that is rustling in a breeze does not trigger an event.

If an event is not triggered 112, process control proceeds back to block 108 as ROI scanning data continues to be received.

Alternatively, if an event is triggered 114 (e.g., a person moves through the ROI), process control moves to block 116 where the scanning data is further analyzed. This further analysis of the scanning data includes searching the scanning data for OOI patterns using the prediction function generated during calibration. At decision block 118, it is determined whether or not an OOI pattern is identified in the scanning data. If an OOI pattern is not identified 120, process control proceeds back to block 108 where scanning data continues to be obtained.

On the other hand, if one or more OOI patterns are identified 122, process control proceeds to block 124 where an alert is sent. The alert may be sent to an operator or other person so that further action can be taken if needed.

The latency between receiving the radar signals and processing the radar signals when tracking individuals is generally less than the same latencies that occur in other systems using lidar, cameras, or depth cameras. As such, the object detection system discussed herein is generally more efficient than these other systems.

Figure 1B:
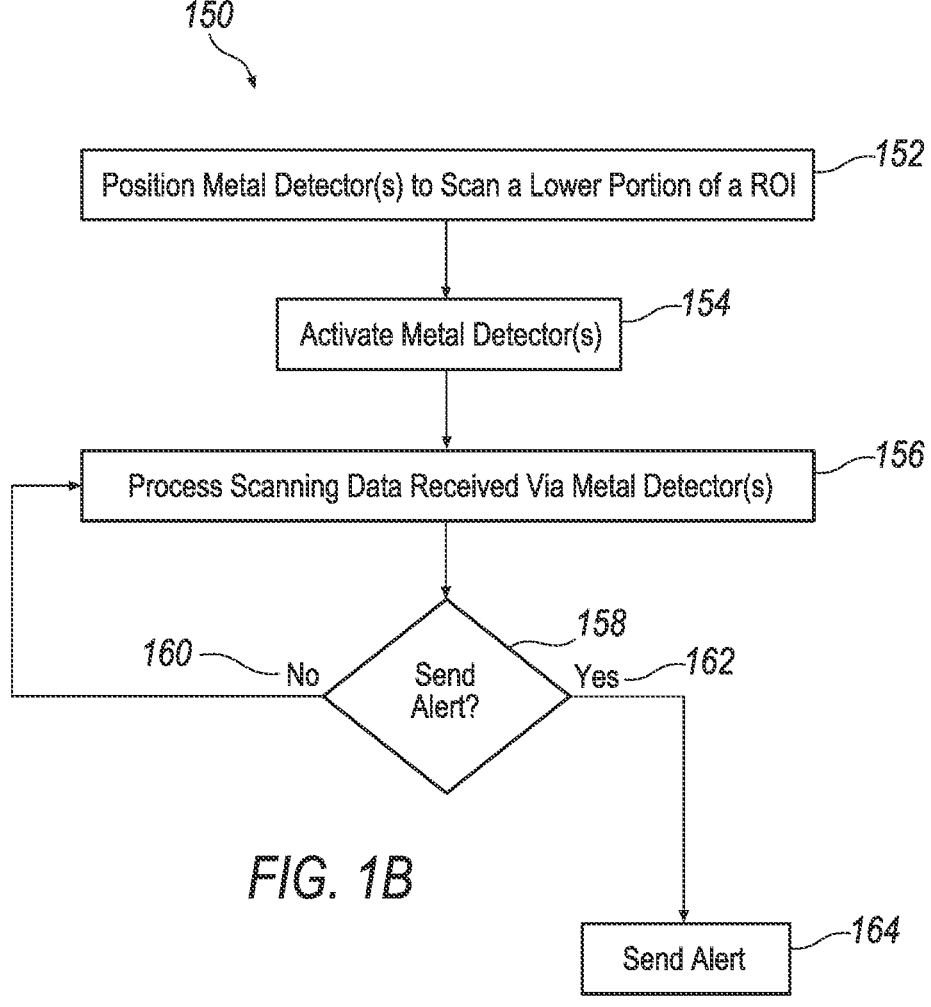
FIG. 1B illustrates another exemplary technique for detecting an OOI.

With reference now to FIG. 1B, an exemplary technique 150 for identifying a potential object-of-interest (e.g., a weapon) below an individual's torso using at least one metal detector or magnetometer of the object detection system is shown. While systems and techniques discussed herein refer to employing one or more metal detectors or magnetometers, these systems and techniques may employ either metal detectors or magnetometers or a combination of both. As such, when the term "metal detector" is used herein, it is understood that it instead could be replaced with the term magnetometer.

Technique 150 begins at block 152 where at least one metal detector is positioned to scan a ROI. The ROI may be the same as, similar to, or different than the ROI of technique 100. Regardless of how the ROI of technique 150 is defined, the at least one metal detector is positioned and/or focused such that it primarily scans the legs (i.e., an area below a person's torso) of individuals passing through the ROI. In other words, the metal detector(s) are focused on an area in the ROI where an individual's legs will likely be found. Testing can be carried out on site to ensure proper positioning and focusing of the metal detector(s). Once positioned, process control proceeds to block 154 where the at least one metal detector is activated such that scanning by the metal detector(s) begins.

At block 156, the object detection system processes scanning data received via the metal detector(s). To keep track of the data in a temporal sense, the scanning data may be stored in a driver that feeds the data into a first-in first-out (FIFO) buffer. The processing of the metal detector scanning data may include comparing one or more thresholds with the metal detector scanning data. The one or more thresholds may be employed to minimize "false positives." That is, one or more thresholds may be set so that items such as a shoe zipper or eyelets do not trigger an alert, but a weapon such as, for example, a gun or knife will trigger an alert. As such, false positives can be minimized. In other instances, thresholds may be employed to create slots. That is, the detection system may only produce an alert if the signal received via the metal detector(s) is greater than one threshold and less than another threshold (i.e., within a slot). Regardless of how many thresholds are employed, they can be determined based on the type of objects that are to be identified.

By comparing the scanning data to the one or more thresholds, the detection system can determine whether or not to send an alert at decision block 158. If, through comparison of the metal detector scanning data to the threshold(s), an alert is not triggered 160, process control proceeds back to block 156, where metal detector scanning data continues to be processed. Alternatively, if the comparison of the scanning data with the threshold(s) leads to an alert being triggered 162, process control proceeds to block 164 and an alert is provided or sent to the user.

Figure 1C:
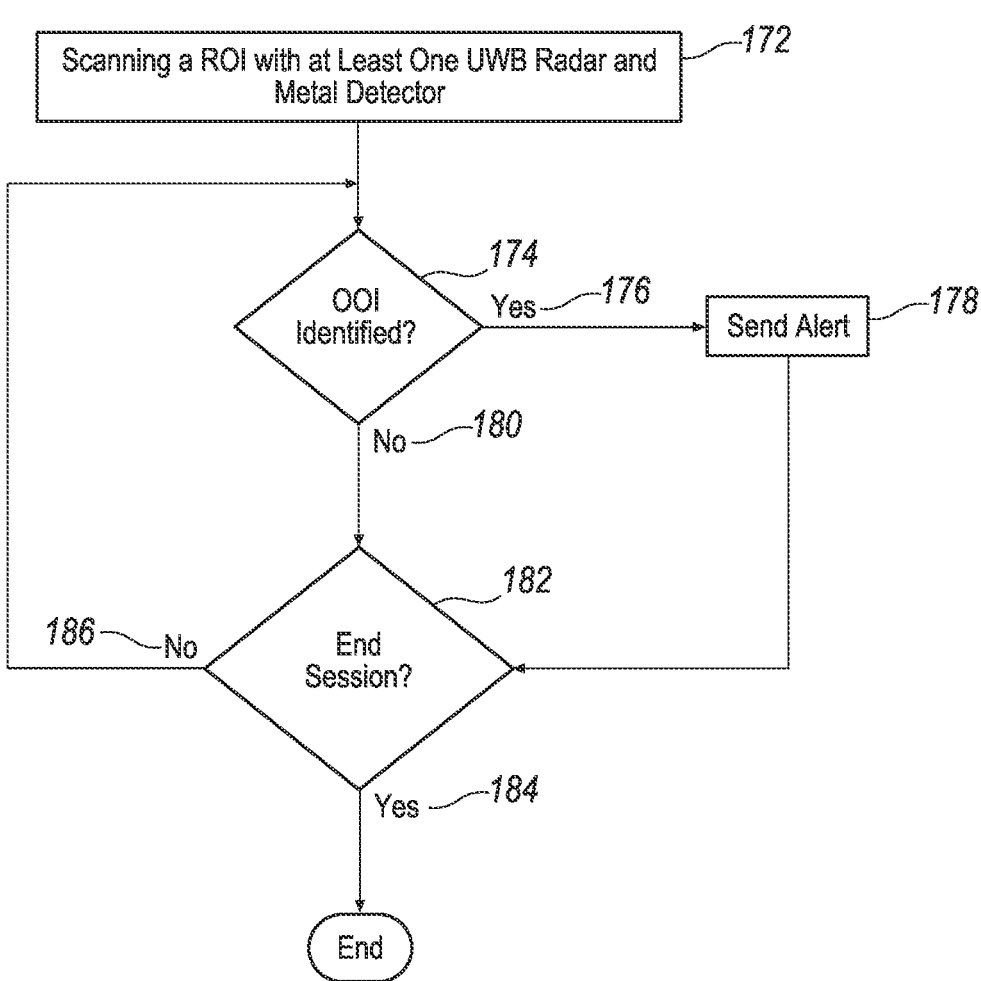
FIG. 1C illustrates another exemplary technique for detecting an OOI.

Technique 100 of FIG. 1A and technique 150 of FIG. 1B run concurrently. As such, an alert will be triggered if an OOI is identified via the UWB radar(s) and/or if the metal detector(s) identify a metal exceeding one or more thresholds. For example, FIG. 1C represents a technique 170 for detecting objects of interest using a system or device that employs at least one UWB radar as well as at least one magnetometer or metal detector. As mentioned above, for the sake of simplicity, the term metal detector will be employed herein to refer to magnetometer(s) as well.

Technique 170 begins at block 172 where scanning a ROI concurrently with at least one UWB radar and at least one metal detector is carried about. The system or device may be configured to initiate the scanning when motion is detected in the ROI.

The UWB radar(s) may be focused on the entire ROI or an upper region of the ROI, while the metal detector(s) may be focused on a lower region of the ROI. It has been found that, in some instances, identifying an OOI using UWB radar may not be as effective when the OOI is located on, for example, an individual's leg. This may be due, for example, to the non-linear motion of an individual's legs as they walk through the ROI. While an object on an individual's torso generally has a linear motion as it moves from one end of the ROI to the opposite end of the ROI, an object on an individual's leg moving through the ROI does not have the same general linear motion since its position varies more in the xy-plane due to the motion of the leg. As such, by "focusing" the metal detector(s) on the lower region of the ROI, the capabilities of the metal detector(s) are leveraged to increase the accuracy of OOI detection in the lower region of the ROI.

With continued reference to FIG. 1C, as scanning continues, process control determines if an OOI is identified by either or both of the radar(s) and metal detector(s) at block 174. If an OOI is identified 176, process control proceeds to block 178 where an alert is provided or sent to a user (e.g., a security technician). The alert may take a variety of forms. For example, the alert may visually identify the individual with the OOI or the alert may visually identify the individual with the ROI while also identifying where on the individual's body the OOI was detected. It is noted that scanning continues even when an alert is sent to a user. Accordingly, it is possible that if multiple individuals have an OOI and are moving through the ROI at the same time, multiple alerts may be sent to the user(s).

Regardless of whether an OOI is detected 176 or not 180, scanning via the UWB radar(s) and the metal detector(s) continues until the session is ended. For example, at decision block 182 process control determines whether or not to end the scanning session. If, for example, the scanning system or device is employed to scan individuals at a sporting or political event, the user may decide to end the scanning session after the event ends. As such, the user may simply provide an input to the system to end 184 the session. If an end-input is not provided 186, the session continues.

As mentioned above, UWB radar excels at identifying OOIs on or near the torso area of an individual. This is at least partially because an OOI positioned in this region generally moves through the ROI in a horizontally linear fashion. In contrast, however, an OOI on a person's leg (e.g. calf) does not generally move through the ROI in a horizontally linear fashion. As such, it can be time consuming for the pattern recognition device of the detection system to learn to identify OOIs on an individual's legs. Since it is important to identify an OOI as quickly as possible, the metal detector(s) serve as an effective back-up for the object detection system in case the pattern recognition system does not identify an OOI on a person's legs.

As also mentioned above, the metal detector(s) are positioned and focused in such a manner that they primarily scan the legs, or at least calves, of individuals. As such, if an individual is carrying, for example, keys in their hip pocket, an alert is unlikely to be triggered by the metal detector(s). Further, since one or more thresholds can be employed, smaller metal items on a person's shoes or legs are also less likely to trigger a false positive. Together, the UWB radar system and the metal detector system of the object detection system are effective at providing alerts when an OOI is on a person moving through the ROI.

Figure 2:
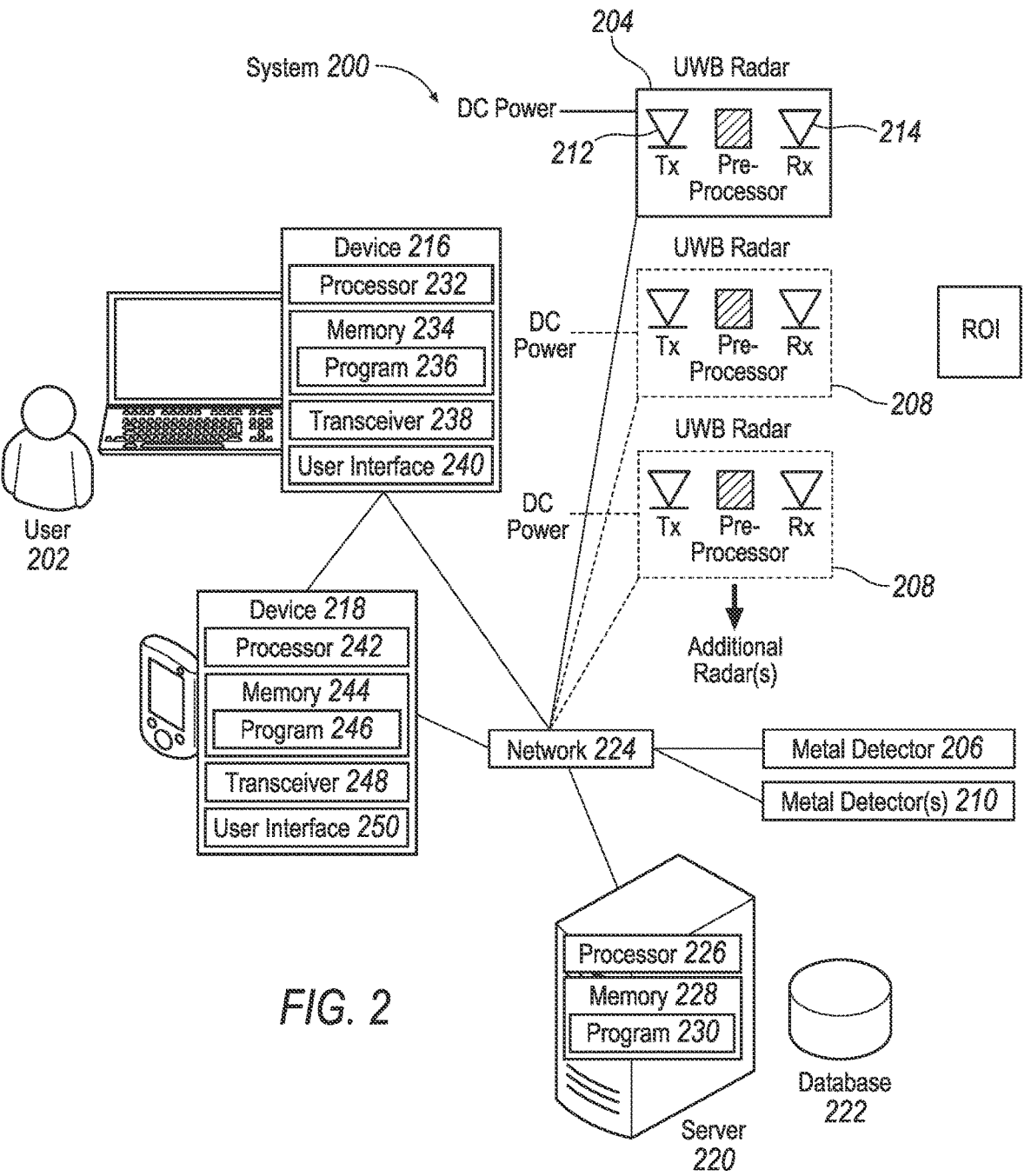
FIG. 2 illustrates an exemplary hardware configuration of an object detection system.

With reference now FIG. 2, an exemplary system 200 utilized by a user 202 (e.g., security personnel) to detect weapons or other contraband on moving subjects or objects is shown. While one or more configurations of the detecting system 200 are discussed below, other configurations not discussed may instead be employed.

For data collection or data generation activities, the exemplary system 200 includes at least a first UWB radar 204 and at least a first metal detector 206. One or more Additional UWB radars 208 and metal detector(s) 210 may also be included. While the additional UWB radars 208 and metal detector(s) 210 may be beneficial to provide additional or redundant coverage of one or more regions-of-interest, or to enlarge coverage in one or more regions-of-interest, a single UWB radar and metal detector may be sufficient to detect contraband of interest (e.g., weapons such as guns and/or knives).

Each UWB radar includes a transmit (Tx) antenna and at least one receive (Rx) antenna (see, e.g., the transmit antenna 212 and receive antenna 214 of the first UWB radar 204). In other examples, however, one or more of the UWB radars may include more than one receive antenna to allow for beam steering.

With regard to the one or more UWB radars 204, 208 (referred to by some as radar arrays), each may be operated independently of the others, and therefore may be operated in a non-synchronized manner. That is, each UWB radar can be independently operated and in a stand-alone arrangement to detect contraband, and does not include or require information from another UWB radar. Further, each does not require additional information from other imaging systems. Similarly, the metal detectors 206, 210 may also operate independently from one another and do not require information from other imaging systems.

Whether or not additional UWB radars are employed, the object detection system 200 may be configured to direct or reposition the one or more UWB radar(s) 204, 208 via actuators or the like toward a ROI, or even to define an ROI. Similarly, the detection system 200 may also be configured to direct or reposition position the one or more metal detectors 206, 210 via actuators or the like to different areas in a ROI.

For computing activities, the exemplary system 200 may include a first compute device 216, a second compute device 218, a server 220, a database 222, and a hub or network 224.

To carry out computing activities related to pattern recognition, the server 220 may be employed to carry out pattern recognition heuristics. The server 220 may include one or more processors 226, memory 228, and one or more programs 230. The pattern recognition heuristics carried out by the server 220 may be capable of learning from data, enhancing its learning through heuristics or other 'rules of thumb' that may be present or identified based on its learning ability, and writing its own heuristics or predictive functions.

For additional computing activities, the first compute device 216 may include one or more processors 232, memory 234, one or more programs 236, one or more transceivers 238, and a user interface 240. In a similar manner, the second compute device 218 (e.g., phone or tablet) may include one or more processors 242, memory 244, one or more programs 246, one or more transceivers 248, and a user interface 250.

Figure 3A:
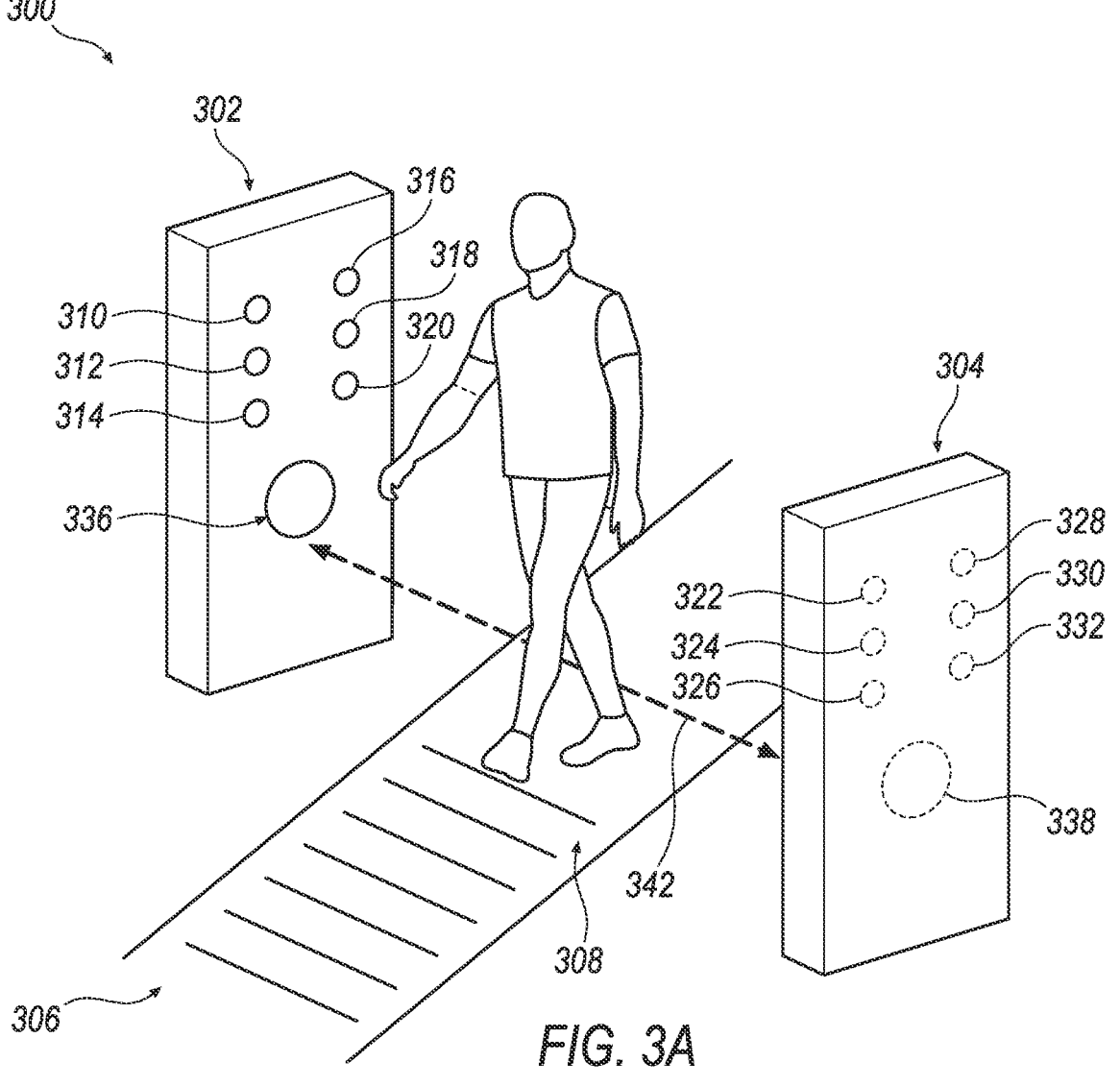
FIG. 3A illustrates an exemplary object detection system.
Figure 3B:
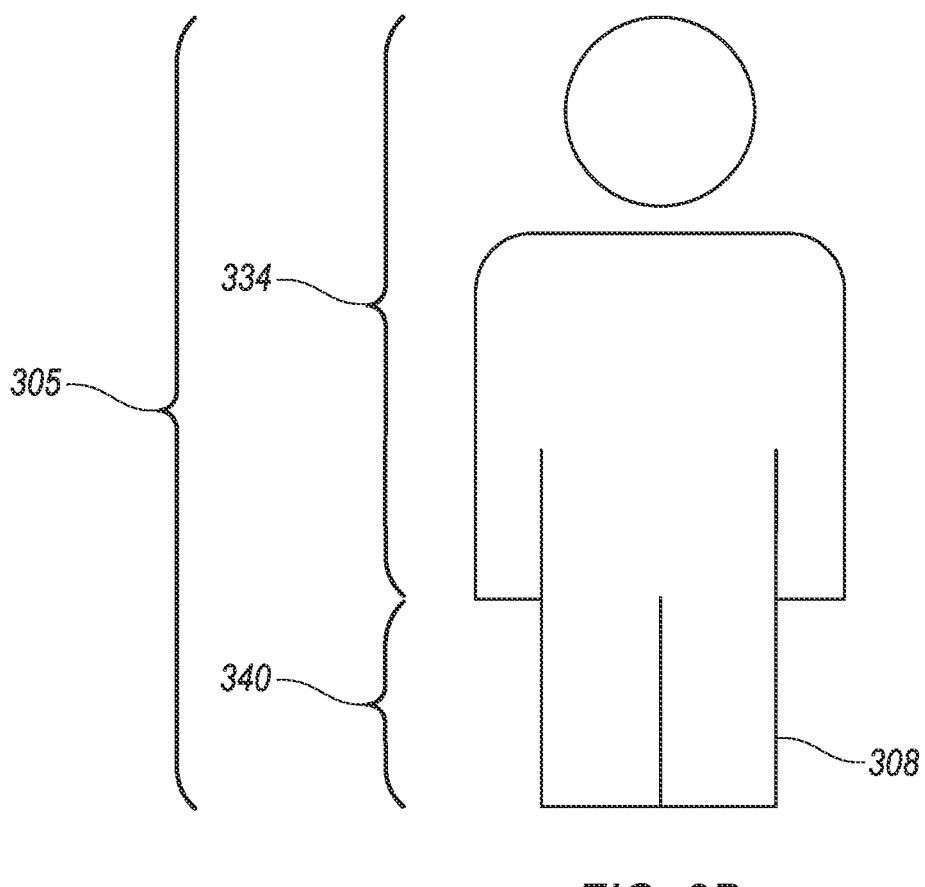
FIG. 3B illustrates a portion of an exemplary region-of-interest (ROI) scanned by the exemplary object detection system of FIG. 3A.

With reference now to FIGS. 3A and 3B, an exemplary object detection system 300 is illustrated. The system includes a first tower 302 and a second tower 304 on opposites sides of a ROI 305 that includes a walkway 306. The towers 302, 304 are positioned such that a subject 308 can pass therebetween as s/he moves through the ROI 305 that includes the walkway 306. While one subject 308 is illustrated in FIG. 3A, the object detection system 300 is capable of concurrently scanning multiple moving individuals. As such, the object detection system 300 may be employed to scan the ROI 305 having crowds of individuals passing therethrough.

With continued reference to FIGS. 3A and 3B, the first tower 302 includes six UWB radars 310, 312, 314, 316, 318, 320. In a similar manner, the second tower 304 includes six UWB radars 322, 324, 326, 328, 330, 332. Each UWB radar 310-332 is aligned or positioned in such a manner that each sends and receives signals to and from at least a subject's torso area 334.

With respect to energy emission, the UWB radars 310-332 may emit short duration low energy (e.g., less than 200 microwatts) bi-phase pulses over a large bandwidth. Further, the UWB radar data may, for example, be captured at 40 frames per second.

While FIG. 3A illustrates each tower 302, 304 including six UWB radars 310-320, 322-332, other exemplary systems may include just one radar on each tower, or two or more radars on each tower. In yet another example, only one radar on one tower may be employed Though not shown in FIG. 3A, each UWB radar 310-332 includes a transmit antenna and at least one receive antenna (see, e.g., Tx antenna 212 and Rx antenna 214 of the UWB radar 204 of FIG. 2). If each UWB radar includes more than one receive antenna, beam steering may be employed.

With reference back to FIGS. 3A and 3B, the exemplary system 300 also includes a first metal detector 334 on the first tower 302 and a second metal detector 336 on the second tower 304. Metal detectors can do a good job of detecting weapons along or near the feet and legs of subjects, but may have a high false alarm rate with objects at least partially metal (e.g., keys, backpacks, phones, and/or purses) placed at waist level or higher. As such, the metal detectors 336, 338 are positioned and focused such that they send and receive signals to and from the general leg region 340 (e.g., calf) of the subject 308. Testing can be carried out on site to ensure proper positioning and focus so that the metal detectors do not inadvertently send false positives if the subject 308 has non-OOI metal objects on their torso region.

A distance 342 between the metal detectors 336, 338 ensures one metal detector does not interfere with the other. This distance 342 is dependent on the type of metal detector (s) (or magnetometer) employed and, as such, may varying depending on implementations.

While exemplary system 300 employs two metal detectors 336, 338, other exemplary systems may employ one metal detector or more than two metal detectors. Still further, other exemplary systems may include only one tower with one or more UWB radars and one or more metal detectors.

Systems discussed herein, such as the system 300 of FIG. 3A, is capable of being hidden from view from, for example, attendees of an event. For example, the towers 302, 304 of FIG. 3A may be placed behind a barrier opaque or partially transparent to visible light, thus obscuring the towers 302, 304 from attendees. Any barriers that do not interfere with operation of the system 300 may be employed. For example, barriers transparent to the UWB radar and to the type of metal detector or magnetometer employed may be used. Further, the barrier may be comprised of more than one material. For example, an upper portion of the barrier may be comprised of a material transparent (or mostly transparent) to UWB radar and a bottom portion of the barrier may be comprised of a material transparent (or mostly transparent) to the metal detector or magnetometer employed.

Once deployed, system 300 is engaged in a training process (i.e., calibration) so that the system can properly predict the presence of OOI patterns, or objects-of-interest. For example, see the training or calibration process set forth above with respect to FIG. 1A.

In one example, each UWB radar 310-332 of FIG. 3A may operate having up to a 10 meter range to the ROI 306. Other ranges, however, may be employed. The object detection system 300 provides the ability to detect objects, such as a weapon on persons 308, through walls, clothing, bags, luggage, and the like. Very low loss of signals through common materials such as drywall, glass, and the like can be obtained. In one example the system provides 1 mm resolution or less in object identification.

According to one example, the UWB radars 310-332 have a 7.3 GHz center frequency with a 1.5 GHz bandwidth. Other examples, however, may employ a different center frequency (e.g., between 6 and 8 GHz) and/or a different bandwidth. Differential RF terminals may be used for low noise and distortion, thus yielding high sensitivity in both static and dynamic applications. In general, the detection system 300 device utilizes very low power levels significantly below Federal Communications Commission (FCC) Class B limits for electronic devices designated for residential space, enabling its use in most worldwide markets. In one example, bi-phase, or binary phase, coding is used for transmitting pulses via the UWB radar(s) for spectrum spreading. Also, a master/slave Serial Peripheral Interface (SPI) may be employed, where a synchronous serial communication interface may be used for short-distance communication, with Quad SPI mode employed for higher data rates. Digital down-conversion may convert digitized, band limited signal, to a lower frequency signal and a lower sampling rate, while further filtering may also be applied.

A small footprint Chip Scale Packaging may be used for high density integration. In one example, a 3"×1.5"×0.375" board is used having low power requirements to facilitate battery operation of each UWB radar 310-332. An impulse Radar Transceiver System on a Chip (SoC) may also be used with a commercially available UWB chips.

Figure 4:
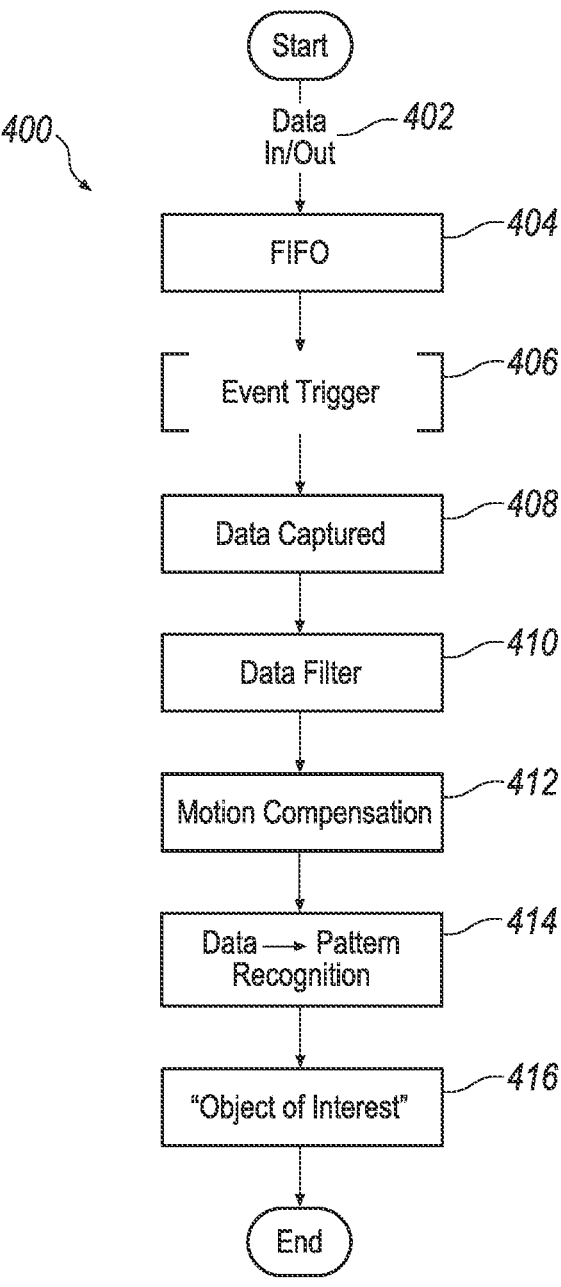
FIG. 4 illustrates another exemplary technique for OOI detection.

Referring now to FIG. 4, an exemplary technique 400 for object detection is shown. The technique 400 begins at block 402 where signals (e.g., UWB radar signals and metal detector signals) pass in and out of an object detection system (see, e.g., the system 300 of FIG. 3). The signals may be stored in one or more drivers and then placed in a first-in and first-out (FIFO) buffer at block 404 to gather and monitor data until an event trigger occurs at block 406. An event trigger occurs when, for instance, the ROI is disrupted by passage of, for instance, a person. RF and broadband data are captured at block 408, and the data is filtered at block 410 using pass and other known filters to remove background, and the like. Motion compensation may be applied at block 412, and factors may be determined or calculated and applied to account for gait and stride artifacts. Processed data may then be fed to a pattern recognition heuristic at block 414, and contrasted with previously obtained 'ground truth' data patterns, and an object-of-interest prediction is made at block 416. That is, the previously obtained 'prediction function' is used to identify possible OOIs via their OOI patterns, based on the learning performed as discussed above with respect to FIG. 1A. The process ends, and control continually passes back to the start and monitoring continues until another event trigger occurs at block 406.

Thus, according to the disclosure, a system includes an ultra-wideband (UWB) radar having a transmitter that transmits electromagnetic waves toward a region-of-interest (ROI), and having a receiver that receives reflected electromagnetic waves coming from the ROI. The system also includes i) at least one metal detector or at least one magnetometer configured to detect metal in a lower region of the ROI; ii) a pattern recognition device having a processor and configured to identify at least one object-of-interest (OOI) that is moving through the ROI, wherein the pattern recognition device searches for object-of-interest (OOI) patterns in scanning data to identify the at least one OOI, and wherein the scanning data is derived from the reflected electromagnetic waves; and iii) a signaling device configured to send an alert when a) at least one OOI pattern of the OOI patterns is identified in the scanning data by the pattern recognition device and b) metal is detected by the at least one metal detector or the at least one magnetometer.

Also according to the disclosure, a method includes i) transmitting electromagnetic ultra-wideband (UWB) waves, via a UWB transmitter of an object detection system, towards a region-of-interest (ROI); receiving reflected UWB waves, via a UWB receiver, from the ROI; ii) generating UWB scanning data from the reflected UWB waves when there is movement in the ROI; iii) utilizing a pattern recognition device to identify object-of interest (OOI) patterns in the scanning data, wherein the pattern recognition device is configured to identify an OOI moving through the reflected UWB waves; iv) detecting metal, via at least one of a metal detector and a magnetometer, moving through a lower region of the ROI; and v) producing an alert when at least one of a) the pattern recognition device identifies at least one OOI pattern in the scanning data and b) metal is detected by at least one of the metal detector and the magnetometer.

Further, according to the disclosure, a non-transitory computer-readable medium tangibly embodies computer-executable instructions of a program being executable by at least one hardware processor of an object detection system. The instructions are configured to cause the object detection system to do the following: transmit ultra-wideband (UWB) pulses, via at least one UWB radar, toward a region-of-interest (ROI); create operational scanning data from reflected UWB pulses; identify at least one object-of-interest (OOI) that is moving through the ROI, wherein identification of the at least one OOI comprises identification of at least one OOI pattern in the operational scanning data; scan, via at least one of a metal detector and a magnetometer, a lower region of the ROI; and create an alert when the at least one OOI is identified and when metal is detected in the lower region of the ROI by at least one of the metal detector and the magnetometer.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain examples, and should in no way be construed so as to limit the claims.

Accordingly reference now back to FIGS. 1A-4 discussed above, exemplary system(s) and devices may be any computing system and/or device that includes a processor (e.g., processors 226, 232, 242 of FIG. 1B) and a memory (e.g., memory 228, 234, 244). Computing systems and/or devices generally include computer-executable instructions, where the instructions may be executable by one or more computing devices (216-220) such as those listed above and below. Computer-executable instructions may be compiled or interpreted from computer programs created using a variety of programming languages and/or technologies, including, without limitation, and either alone or in combination, Java™, C, C++, Visual Basic, Java Script, Perl, etc. The exemplary system(s), device(s), and items therein may take many different forms and include multiple and/or alternate components. While exemplary systems, devices, and modules are shown in the Figures, the exemplary components illustrated in the Figures are not intended to be limiting. Indeed, additional or alternative components and/or implementations may be used, and thus the above examples should not be construed as limiting.

In general, computing systems and/or devices may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, California), the AIX UNIX operating system distributed by International Business Machines of Armonk, N.Y., the Linux operating system, the Mac OS X and iOS operating systems distributed by Apple Inc. of Cupertino, California, the BlackBerry OS distributed by Research In Motion of Waterloo, Canada, and the Android operating system developed by the Open Handset Alliance. Examples of computing systems and/or devices include, without limitation, personal computers, cell phones, smart-phones, super-phones, tablet computers, next generation portable devices, handheld computers, secure voice communication equipment, or some other computing system and/or device.

Further, the processor or the microprocessor of computing systems and/or devices receives instructions from the memory and executes these instructions, thereby performing one or more processes, including one or more of the processes described herein. Such instructions and other data may be stored and transmitted using a variety of computer-readable mediums (e.g., memory 228, 234, 244).

A CPU or processor may include processes comprised from any hardware, software, or combination of hardware or software that carries out instructions of a computer programs by performing logical and arithmetical calculations, such as adding or subtracting two or more numbers, comparing numbers, or jumping to a different part of the instructions. For example, the processors 226, 232, 242 of FIG. 1B may be any one of, but not limited to single, dual, triple, or quad core processors (on one single chip), graphics processing units, visual processing units, and virtual processors.

Memory (e.g., memory 228, 234, 244) may be, in general, any computer-readable medium (also referred to as a processor-readable medium) that may include any non-transitory (e.g., tangible) medium that participates in providing data (e.g., instructions) that may be read by a computer. Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Further, the use of terms such as "first," "second," "third," and the like that immediately precede an element(s) do not necessarily indicate sequence unless set forth otherwise, either explicitly or inferred through context.

What is claimed is:

1. A system comprising:
an ultra-wideband (UWB) radar having a transmitter that transmits electromagnetic waves toward a region-of-interest (ROI), and having a receiver that receives reflected electromagnetic waves coming from the ROI;
at least one metal detector or at least one magnetometer configured to detect metal in a lower region of the ROI;
a pattern recognition device having a processor and configured to identify at least one object-of-interest (OOI) that is moving through the ROI, wherein the pattern recognition device searches for object-of-interest (OOI) patterns in scanning data to identify the at least one OOI, and wherein the scanning data is derived from the reflected electromagnetic waves, wherein the pattern recognition device is configured to compare calibration data with the scanning data to identify the at least one OOI, wherein the calibration data is derived from:
scanning data from an individual, in the ROI, carrying the at least one OOI; and
scanning data from the individual, in the ROI, not carrying the at least one OOI,
wherein the individual not carrying the OOI may be a different than the individual carrying the OOI; and
wherein the system further comprises a signaling device configured to send an alert when i) at least one OOI pattern of the OOI patterns is identified in the scanning data by the pattern recognition device and ii) metal is detected by the at least one metal detector or the at least one magnetometer.

2. The system of claim 1, wherein the at least one metal detector or magnetometer is positioned to generally focus on legs of individuals.

3. The system of claim 1, wherein at least one threshold is employed by the system so objects smaller than a handgun detected by the at least one metal detector or the at least one magnetometer does not trigger the alert.

4. The system of claim 1, wherein at least one OOI pattern of the OOI patterns is associated with one of a knife and a gun.

5. The system of claim 1, wherein the transmitted electromagnetic waves from the at least one UWB radar are bi-phase pulses.

6. The system of claim 1, wherein movement in the ROI causes scanning data to be generated.

7. The system of claim 6, wherein the at least one OOI is a weapon.

8. The system of claim 7, wherein the system passes the scanning data into a first-in and first-out (FIFO) buffer.

9. A method comprising:
creating calibration data for an object detection system, wherein creating calibration data comprises:
receiving reflected ultra-wideband (UWB) waves from an individual in a region of interest (ROI) having an object of interest (OOI) thereon; and
receiving reflected UWB waves from the individual in the ROI not having an OOI thereon, wherein the individual having the OOI thereon may be different than the individual not having the OOI thereon; and
wherein the method further comprises transmitting electromagnetic UWB waves, via a UWB transmitter of the object detection system, towards the ROI);
receiving reflected UWB waves, via a UWB receiver, from the ROI;
generating UWB scanning data from the reflected UWB waves when there is movement in the ROI;
comparing the scanning data to the calibration data to;
utilizing a pattern recognition device to identify OOI patterns in the UWB scanning data based, at least in part, on the comparison of the scanning data to the calibration data, wherein the pattern recognition device is configured to identify an OOI moving through the ROI, wherein the OOI represented in the calibration data may be different than the OOI moving through the ROI;
detecting metal, via at least one of a metal detector and a magnetometer, moving through a lower region of the ROI; and
producing an alert when at least one of i) the pattern recognition device identifies at least one OOI pattern in the scanning data and ii) metal is detected by at least one of the metal detector and the magnetometer.

10. The method of claim 9, wherein the electromagnetic UWB waves are bi-phase pulses.

11. The method of claim 9 further comprising focusing at least one of the metal detector and the magnetometer on the lower region of the ROI such that metal on an individual's legs triggers the alert and metal on the individual's torso does not trigger the alert.

12. The method of claim 11 further comprising implementing at least one threshold so metallic non-weapons on the individual's legs do not rigger the alert.

13. A non-transitory computer-readable medium tangibly embodying computer-executable instructions of a program being executable by at least one hardware processor of an object detection system, the instructions are configured to cause the object detection system to:
generate calibration data, wherein the calibration data comprises:
calibration scanning data from a human carrying the at least one object of interests (OOI) in a region of interest (ROI); and
calibration scanning data from a human in the ROI not carrying the at least one OOI, wherein the human carrying the at least one OOI may or may not be the same human carrying the at least one ROI
wherein the instructions are further configured to cause the object detection system to:
transmit ultra-wideband (UWB) pulses, via at least one UWB radar, toward the ROI;

create operational scanning data from reflected UWB pulses;

identify at least one OOI that is moving through the ROI, wherein identification of the at least one OOI comprises identification of at least one OOI pattern in the operational scanning data;

scan, via at least one of a metal detector and a magnetometer, a lower region of the ROI; and create an alert when the at least one OOI is identified and when metal is detected in the lower region of the ROI by at least one of the metal detector and the magnetometer.

14. The medium of claim 13 having further instructions to cause the object detection system to initiate the creation of the operational scanning data when a human individual enters the ROI.

15. The medium of claim 13 having further instructions to cause the object detection system to implement a threshold such that metal, that is smaller than the at least one OOI, and on an individual's leg does not trigger the alert.

16. The medium of claim 13, wherein identification of the at least one OOI that is moving through the ROI includes a comparison of the calibration data with operational scanning data.

* * * * *